United States Patent [19]
Wassenhoven et al.

[11] Patent Number: 5,979,155
[45] Date of Patent: Nov. 9, 1999

[54] SHAFT ARRANGEMENT FOR SUPPORTING AND DRIVING AN OPEN-END SPINNING ROTOR

[75] Inventors: Heinz-Georg Wassenhoven; Hans Grecksch, both of Moenchengladbach, Germany

[73] Assignee: W. Schlafhorst AG & Co., Moenchengladbach, Germany

[21] Appl. No.: 09/163,236

[22] Filed: Sep. 29, 1998

[30] Foreign Application Priority Data

Oct. 2, 1997 [DE] Germany .................. 197 43 744

[51] Int. Cl.⁶ ................................................. D01H 4/00
[52] U.S. Cl. ........................... 57/406; 57/404; 384/317
[58] Field of Search ............... 57/404, 406; 384/317, 384/245, 278, 905, 610

[56] References Cited

U.S. PATENT DOCUMENTS

| | | | |
|---|---|---|---|
| 1,059,313 | 4/1913 | Perkins | 384/317 |
| 5,209,055 | 5/1993 | Hini et al. | 57/406 |
| 5,349,809 | 9/1994 | Stahlecker et al. | 57/406 |
| 5,901,545 | 5/1999 | Stahlecker | 57/406 |

FOREIGN PATENT DOCUMENTS

| | | |
|---|---|---|
| 1 186 691 | 2/1965 | Germany . |
| 2 061 462 | 6/1972 | Germany . |
| 27 03 514 | 8/1978 | Germany . |
| 25 14 734 C2 | 10/1982 | Germany . |
| 40 20 411 A1 | 1/1992 | Germany . |

*Primary Examiner*—William Stryjewski
*Attorney, Agent, or Firm*—Kennedy Covington Lobdell & Hickman, LLP

[57] ABSTRACT

In open-end rotor spinning devices, an axial engagement element, typically a ceramic pin, is inserted as a wear protector in a receptacle at the free end of the rotor shaft which is supported on a ball of an axial bearing. In order to receive the air displaced during the insertion of the axial engagement element, the free end of the shaft is formed with at least one radial bore connecting the receptacle with the ambient environment through which the air displaced during the insertion can escape.

10 Claims, 3 Drawing Sheets

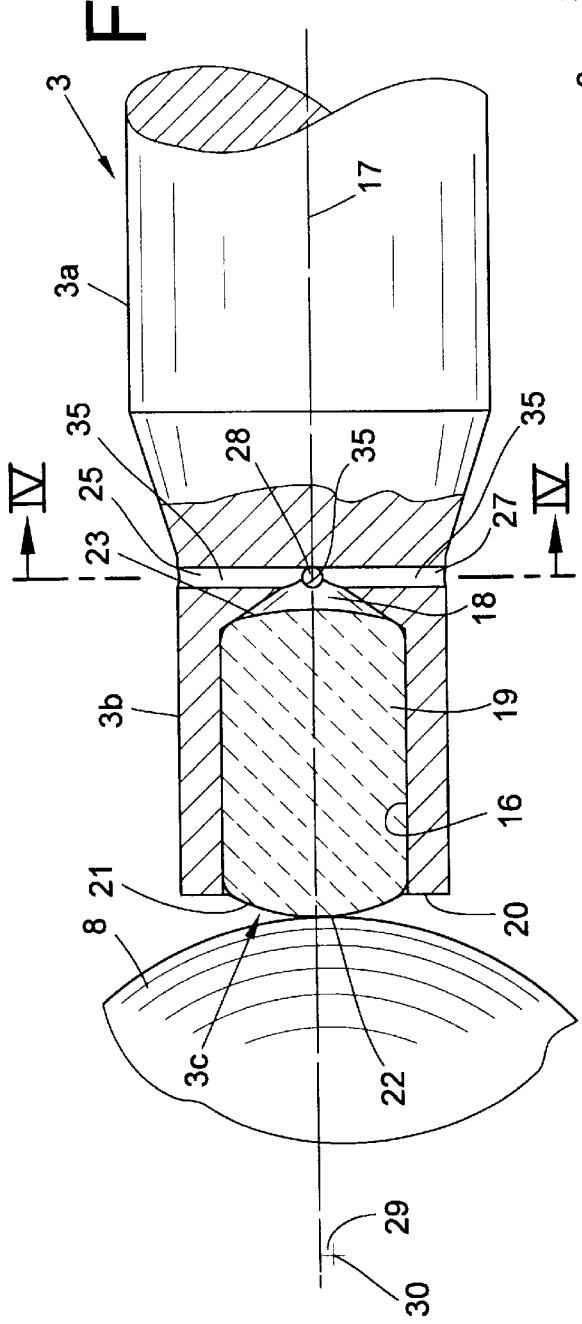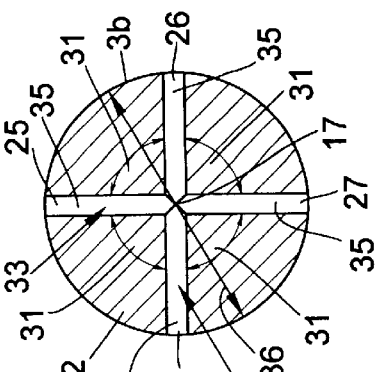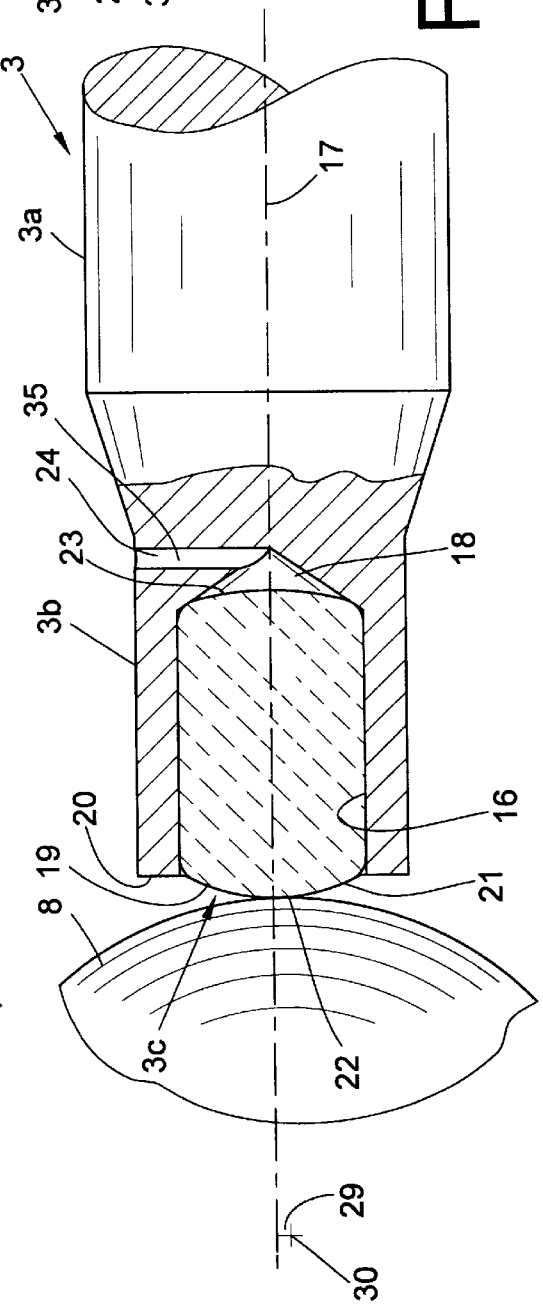

SHAFT ARRANGEMENT FOR SUPPORTING AND DRIVING AN OPEN-END SPINNING ROTOR

BACKGROUND OF THE INVENTION

The present invention relates generally to devices for supporting and driving an open-end spinning rotor and, more particularly, to a rotor supporting and driving assembly having a shaft with a free end in the form of a support rod made of a material harder than steel and disposed in engagement with a ball of an axial bearing, sometime referred to as an axial bearing, within a receptacle concentric to the shaft axis.

In open-end spinning devices, the speed of the spinning rotors is conventionally above 100,000 rpms. Such high speeds place significant requirements on the support of the rotors. German Patent Publication DE 25 14 734 teaches a support arrangement for an open-end spinning rotor which is still used even for the highest speeds of a spinning rotor previously attained.

The rotor cup itself in which the yarn is formed is supported on an elongated shaft which rests on two support-disk pairs set slightly obliquely relative to one another with the free end of the shaft supported on a ball in the axial direction. This achieves a low-wear support. The ball functions as a contact for the rotor shaft and is placed in vibration via a holder for the ball. As a result, the ball is held at support points which are constantly changing. The support-disk pairs for the shaft support are placed slightly obliquely relative to each other to exert a component of force on the shaft to repeatedly urge the shaft and the rotor in the direction of the ball and to return the shaft into contact with the ball whenever the shaft end is lifted off the ball. The position of the ball relative to the axial centerline of the rotor shaft is constantly changing. A minimal eccentricity between the shaft axis and the center of the ball brings about a driving of the ball so that the ball constantly presents a new contact point to the end face of the free shaft end. During the oscillating axial motion of the rotor shaft, wear occurs to the ball and on the shaft end during the rapid succession of the lifting off of the shaft end from the ball and its falling back onto the ball. In particular, if the shaft end is shortened due to deformation or removal of material, an error in the yarn count [i.e. the size of the yarn being spun] can occur because of changes caused in the position of the rotor relative to the yam infeed.

In order to minimize the wear of the shaft end, U.S. Pat. No. 5,349,809 teaches the insertion of a ceramic pin as a so-called axial engagement element on the free end of the shaft in a concentric receptacle of its offset end piece. A front side of the ceramic pin is supported on the ball of the axial bearing. The pin is inserted with very close manufacturing tolerances into the receptacle. Since the receptacle is a blind hole the air in the blind hole must be offered a possibility of escape during the insertion of the pin. This is provided in the state of the art by an enlargement of the blind hole to receive the compressed air or by grooves extending in the longitudinal direction of the pin distributed over its circumference to offer the escaping air a pathway for exiting the receptacle.

These known possibilities have several disadvantages. A notching of the pin on its circumferential surface by the ventilation grooves leads to a reduction of the contact pressure between the pin and the receptacle and thereby reduces the effectiveness of the adhesion of the pin in the shaft. In the case of sharp-edged transitions of the grooves to the circumferential surface of the shaft there is the danger that, when the pin is inserted into the blind hole, material chips off on account of unfavorable variations in stress, which damages the pin. If the pin does not have any ventilation grooves the blind hole must be longer that the pin. Preventive measures must then be taken so that the pin can not shift in the blind hole under load.

SUMMARY OF THE INVENTION

The present invention has the object of avoiding the disadvantages described above, especially during the insertion of a axial engagement element into a blind hole of the rotor shaft.

This objective is attained by providing an open-end rotor spinning device with a novel arrangement for supporting and driving the spinning rotor. In accordance with the present invention, this arrangement basically comprises a drive shaft affixed to the rotor and an axial bearing having a housing concentric to the shaft axis and a ball contained within the housing for axial engagement with the free end of the shaft. The free end of the shaft defines a receptacle which opens axially outwardly and receives and supports therein an axial engagement element made of a material harder than steel for axial engagement with the ball contained within the housing of the axial bearing. According to the present invention, a ventilation bore is formed radially through the free end of the shaft for connecting the receptacle with the ambient environment.

The communication of the receptacle for the axial engagement element with the ambient environment via a ventilation bore in accordance with the invention facilitates the insertion of the axial engagement element, e.g. a ceramic pin, because the air displaced during the insertion of the pin into the receptacle can escape through the ventilation bore into the environment. A further advantage over the state of the art is the fact that the bore for receiving the support element can be formed of a length within the free end portion of the rotor shaft to be only as long as is necessary to accept the length of the axial engagement element to be inserted. Consequently, a weakening of the free end of the shaft by a bore which is longer than the pin or other axial engagement element is avoided. Furthermore, it is not necessary to provide measures to prevent a pressing of the pin too far into the receptacle under the load of the bearing forces. Because the circumferential surface of the pin of the invention does not have any grooves for ventilation a greater frictional contact pressure within the receptacle in the rotor shaft is assured which increases the reliability with which the pin is held in the receptacle.

An imbalance created by the ventilation bore can be compensated by weights. However, instead of only one radial ventilation bore in the free end of the shaft receiving the axial engagement element, it is more advantageous to provide multiple ventilation bores formed radially through the cross section of the shaft at equal angular intervals to converge and intersect with one another at the shaft axis. Such multiple ventilation bores are simple to manufacture if opposing bores are formed as a single linear bore through the shaft, whereby the bores intersect the shaft axis.

In order to avoid an imbalance it is also helpful if all the ventilation bores have the same diameter, which assures a uniform distribution of material and mass of the shaft relative to its cross section.

It is furthermore advantageous if the ventilation bore connects a tip portion of the receptacle for the axial engagement element which is not occupied by the axial engagement element to the ambient environment. The tip area is preferably formed when the receptacle is bored by a drilling process. If the rotor shaft becomes heated during spinning on account of bearing friction, the air within the tip of the receptacle, can expand without hindrance via the ventilation bore.

The invention contemplates that the ventilation bore opens into the receptacle at the forwardmost end of the tip area which becomes closed from the remainder of the receptacle after the complete insertion of the axial engagement element. The air displaced by the insertion of the axial engagement element can in this instance escape almost completely. Only a small amount of residual air is enclosed in the tip area of the receptacle; however, its amount is slight and not noticeably compressed. The pressure rise and the resultant effect of the enclosed air expanding as a consequence of the heating of the rotor shaft on the seat of the axial engagement element are therefore considerably less than in the case of the already compressed, enclosed air according to the known devices in the state of the art.

In order to minimize the weakening of the shaft cross section and maximize the strength of the shaft, it is advantageous if the diameter of a ventilation bore is smaller by at least a power of ten than the diameter of the free end portion of the shaft which carries the axial engagement element. The diameter of the ventilation bores is coordinated with their number and their distribution on the shaft cross section and is preferably between 0.2 mm and 0.5 mm.

In a further advantageous feature of the invention, the opposite end faces of the axial engagement element are of identical configuration which in particular simplifies the working of the axial engagement elements since they do not need to be specially oriented for working or other formation of the end faces. The end faces are formed to be slightly spherical so that point-contact with the ball is possible with the one end face and an easy introduction into the receptacle is possible with the other end face.

In order on the one hand to assure a firm hold of the axial engagement element in the receptacle of the shaft but on the other hand to make it possible beforehand to easily introduce the axial engagement element into the receptacle, the receptacle in the shaft may be configured along an entrance portion of its length with a greater diameter to provide a clearance fit with the axial engagement element and along an interior portion of its length with a lesser diameter to provide a press fit with the axial engagement element. In a preferred embodiment of the invention, the interior portion of the receptacle for accomplishing a press fit is approximately three to four times as long as the entrance portion which accomplishing a clearance fit. At a length of the axial engagement element of approximately 6 mm, the interior portion would be approximately between 4 and 4.5 mm long. Thus, the predominant extent of the receptacle serves for a reliable anchoring of the axial engagement element in the shaft.

The invention is further described in detail hereinbelow with reference to exemplary embodiments shown in the accompanying drawings.

BRIEF DESCRIPTION OF THE DRAWINGS

FIG. 2 is an enlarged side elevational view, partially in axial cross-section, of the free end of the shaft of the rotor support and driving arrangement of FIG. 1 showing a ventilation bore formed therein to facilitate insertion of a ceramic pin as an axial engagement element into the receptacle of the free end of the shaft in accordance with one embodiment of the present invention.

FIG. 3 is an enlarged side elevational view, partially in axial cross-section, of the free end of the shaft of the rotor support and driving arrangement similar to that of FIG. 2, showing a ventilation bore formed therein to facilitate insertion of a ceramic pin as an axial engagement element into the receptacle of the free end of the shaft in accordance with another embodiment of the present invention.

FIG. 4 is a radial cross-sectional view of the shaft of FIG. 3, taken through the free end thereof along line IV—IV showing the entire arrangement of the ventilation bores therein.

DESCRIPTION OF THE PREFERRED EMBODIMENTS

Figure 1:
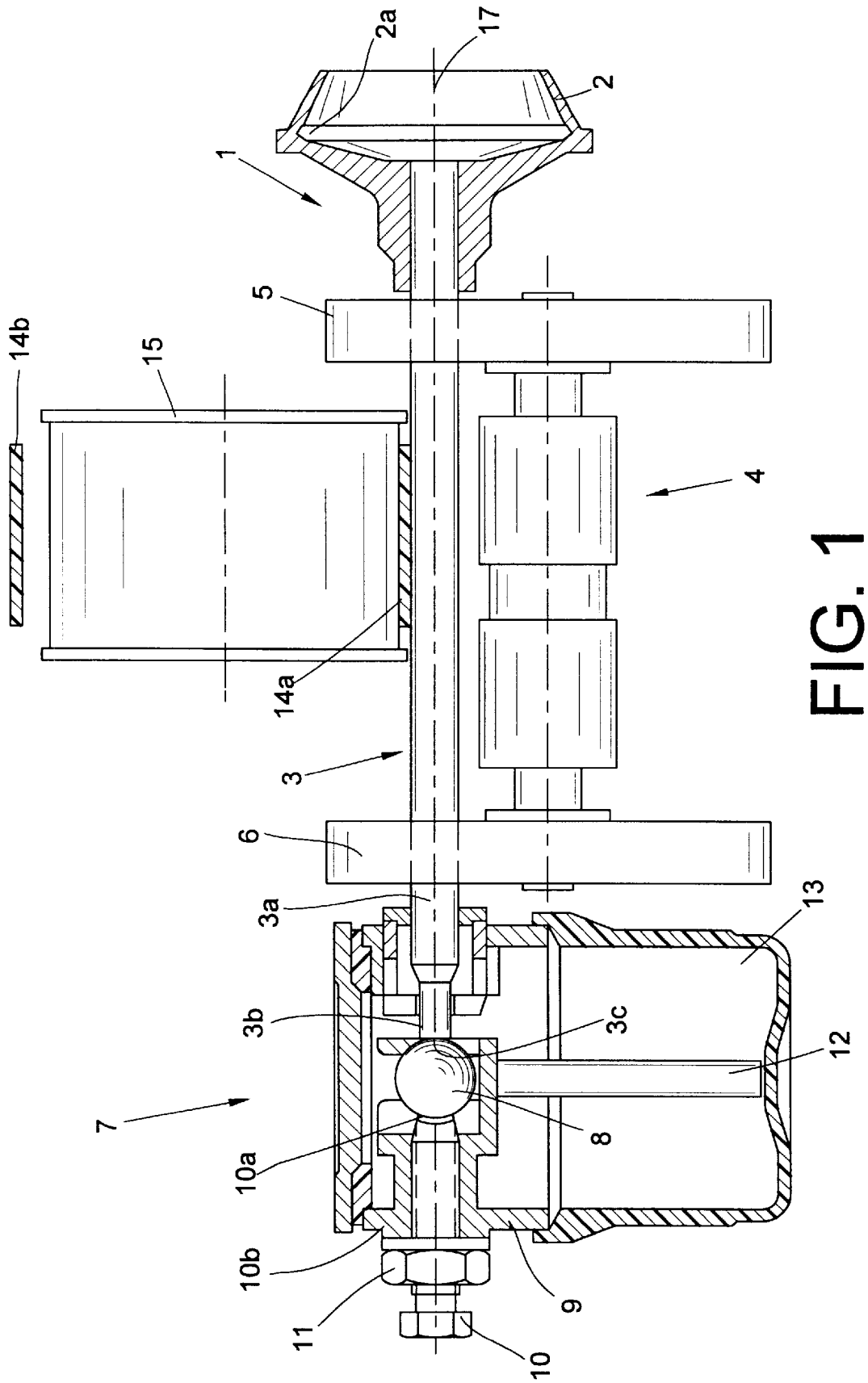
FIG. 1 is a schematic side elevational view, partially in axial cross-section, of a rotor spinning device having a rotor support and driving arrangement in accordance with the present invention.

Referring now to the accompanying drawings and initially to FIG. 1, the principal important features of an open-end rotor spinning device for the support of a spinning rotor are depicted. Spinning rotor 1 of an open-end spinning device is mounted with its support in a housing (not shown here), commonly referred to as a so-called spinning box. Rotor cup 2, in whose rotor groove 2a the yam is formed, is mounted on shaft 3 which serves to support and drive the rotor. Shaft 3 is supported on support-disk bearing 4 consisting of two opposing disk pairs 5 and 6. The design of such a support-disk bearing is known e.g. from German Patent Publication DE-OS 20 61 462.

Free end 3a of the shaft 3 is supported in the axial direction by the end face 3c of a stepped end portion 3b in axial bearing 7 against ball 8. The design of axial bearing 7 corresponds to the design of the support for an open-end spinning rotor according German Patent Publication DE 25 14 734. Ball 8 is supported in housing 9 against front surface 10a of bolt 10 which can be adjusted in the axial direction of shaft 3 relative to housing 9. This adjustment takes place via threading 10b and a stop can be made with counter nut or lock nut 11 of bolt 10. Ball 8 is constantly lubricated by oil wick 12 which extends into oil supply container 13.

Spinning rotor 1 is driven by a tangential belt which runs along one side of a spinning machine and drives all rotors of the spinning stations arranged therealong. Lower belt run 14a of such tangential belt is maintained in contact with shaft 3 by tensioning roller 15 which presses the belt against the rotor shaft between the support-disk pairs of support-disk support 4. Returning upper belt run 14b of the tangential belt travels above tensioning roller 15.

Axial bearing 7 accomplishes the axial guidance of rotor 1. A slightly oblique disposition of support-disk pairs 5, 6 imposes a constant gentle thrust of the rotor shaft against ball 8 of the axial bearing while the shaft is being driven by tangential belt 14a. As a result thereof, end face 3c of the narrowed end portion 3b of free shaft end 3a should rest constantly on ball 8 of the bearing. In this position, rotor 1 always has the correct position in the axial direction relative to the exit opening of the fiber feed conduit (not shown here) of the spinning box. While the machine is running, the ball should not stand still so that a point-contact support load does not always occur at the same place. The contact point between end face 3c and ball 8 changes constantly on account of a minimal eccentricity 29 between shaft axis 17 and center 30 of the ball (FIGS. 2, 3).

FIG. 2 shows shaft end 3a of the shaft 3 of the spinning rotor 1 on a considerably larger scale as it is supported in axial bearing 7 according to FIG. 1. Stepped end portion 3b defines receptacle 16, preferably in the form of a cylindrical recess, concentric to axis 17 of shaft 3. Receptacle 16 is preferably formed by a twist borer whereby the receptacle terminates in a conical tip 18. A cylindrical axial engagement element 19, preferably a ceramic pin consisting of silicon nitride in the present exemplary embodiment, is inserted into receptacle 16. The length of the ceramic pin is approximately 6 mm in the present exemplary embodiment and its diameter approximately 3 mm. The securement of the pin 19 in receptacle 16 takes place as a rule by a press fit. It is also conceivable to adhere ceramic pin 19 in the receptacle. The axially outward surface of shaft 3 is thus composed of the annular surface 20 of tubular end portion 3b of the shaft surrounding the receptacle 16 in combination with outwardly facing end 21 of ceramic pin 19. The outward end of the pin 21 of ceramic pin 19 is convexly curved slightly so that only a point contact at 22 occurs between ceramic pin 19 and ball 8. This point contact 22 is located slightly adjacent to axis 17 on account of eccentricity 29 between center 10 of ball 8 and axis 17 of shaft 3. As a result of this eccentricity 29, ball 8 is put in rotation in order to create constantly changing contact surfaces. This achieves a uniform wear of the ball.

Ventilation bore 24 connects receptacle 16 for ceramic pin or other axial engagement element 19 to the ambient environment, as can be seen due to the longitudinal section through free end 3b of shaft 3. Ventilation bore 24 opens into conical tip area 18 of the receptacle 16, which is not occupied by support element 19, and terminates at the shaft axis 17. Thus, during the insertion of ceramic pin 19, the air within receptacle bore 16 escapes via ventilation bore 24 into the environment. During ongoing spinning operation, the remaining air within the tip area 18 can expand out of tip 18 through ventilation bore 24 as the air becomes heated by the friction created by the axial bearing.

In the present exemplary embodiment ventilation bore 24 extends from the tip area 18 radially with respect to axis 17 of shaft 3, which is the most favorable from a manufacturing standpoint. However, an orientation of the bore which is inclined relative to axis 17 is also possible. The diameter 35 of bore 24 should be smaller than the diameter 36 (FIG. 4) of the free end 3b of shaft 3 which receives axial engagement element 19 by at least a power of ten. Thus, assuming the free end of the shaft has a diameter of approximately 5 mm, the diameter of a ventilation bore should not exceed 0.5 mm. In embodiments having several ventilation bores such as FIGS. 3 and 4 described below, the diameter of the bores should be smaller in order not to impair the strength of the shaft.

FIG. 3 shows another exemplary embodiment of a shaft with support element in which receptacle 16 for axial engagement element 19 is connected to the ambient environment via several ventilation bores 25, 26, 27 and 28 each oriented radially to and converging with one another at shaft axis 17 to open into tip area 18 of the receptacle 16.

As shown by the sectional view of FIG. 4 taken through free end 3b of shaft 3 at the location of ventilation bores 25, 26, 27 and 28, each of the ventilation bores can be seen to be arranged at uniform equidistant angular intervals 31 over its cross section 32. All of the bores converge and intersect at shaft axis 17 and have the same diameter 35.

Since the four ventilation bores 25, 26, 27 and 28 provided in the present exemplary embodiment are oriented radially at an angle of 90 degrees to each other due to the uniform angular intervals 31, the opposing bores 25 and 27 and opposing bores 26 and 28 can be considered to form continuous linear bores 33 and 34 extending completely through the shaft 3. Such a through bore 33, 34 is simple to form from a technical standpoint. The radial/diametric orientation of these ventilation bores relative to one another and their being of the same diameter 35 result in a uniform distribution of the material and thereby of the mass of the shaft end portion 3b over the cross section of the free end of the shaft, which avoids imbalances.

Figure 5:
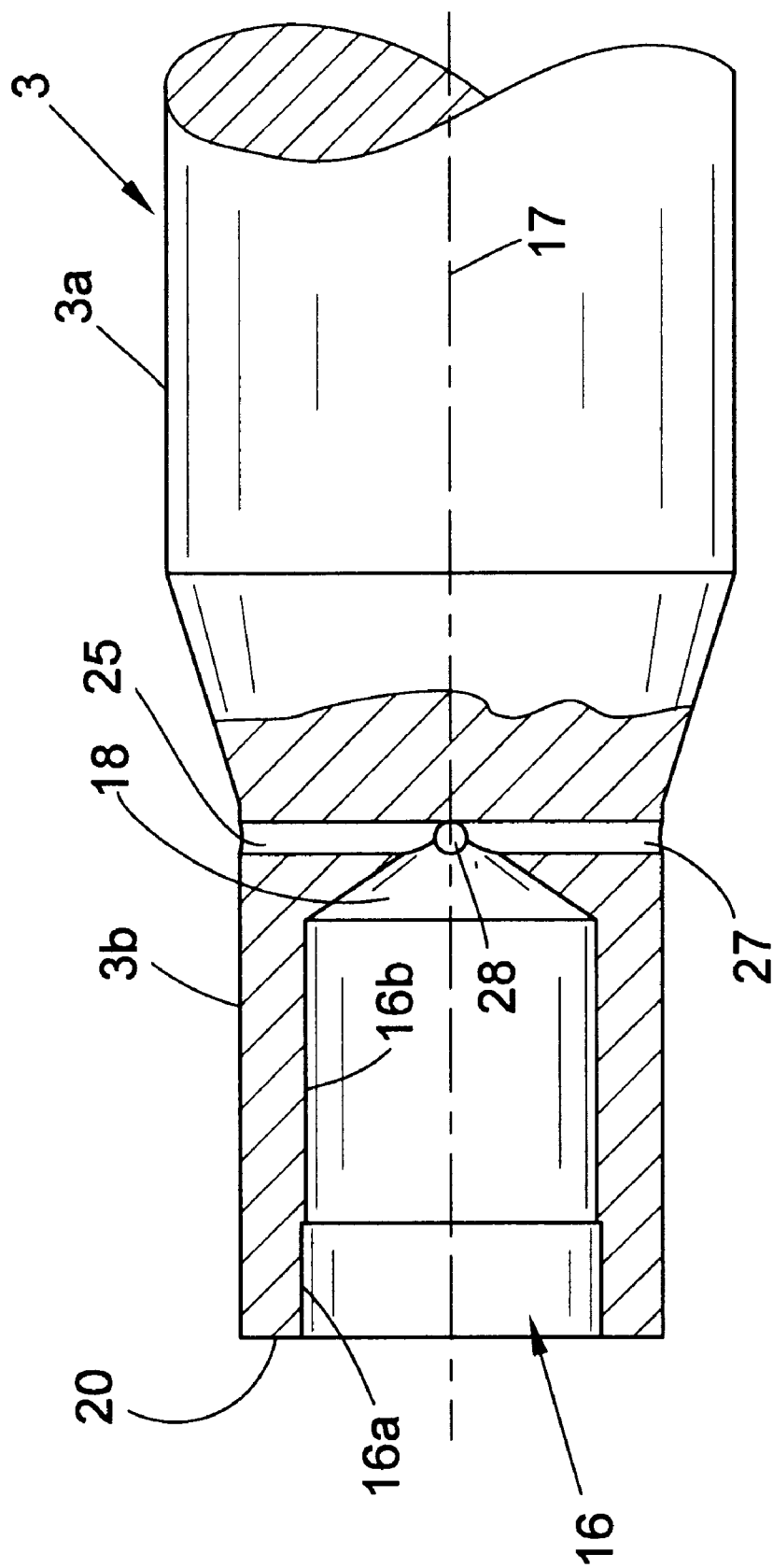
FIG. 5 is an enlarged side elevational view, partially in axial cross-section, of the free end of the shaft of the rotor support and driving arrangement similar to that of FIGS. 2 and 3, but without any axial engagement element in the receptacle of the free end of the shaft to show a stepped configuration of the receptacle at the free end of the shaft to provide for both a press fit and a clearance fit of the axial engagement element, in accordance with a preferred embodiment of the present invention.

FIG. 5 shows a shaft without an inserted axial engagement element. Receptacle 16 in the stepped end portion 3b of the shaft is formed as a bore. This bore comprises two partial sections with different diameters designated as 16a and 16b. The partial bore section designated as 16a extends from the outward annular end surface 20 of shaft 3 to form a pin entrance portion of the receptacle 16 with a greater diameter than following partial section 16b which forms an interior pin retaining portion of the receptacle 16. Partial section 16a thus provides a clearance fit relative to the pin 19 and partial section 16b provides a press fit relative to the pin. Partial section 16a enables an easy introduction of the pin or other axial engagement element into receptacle 16 and partial section 16b achieves a secure fastening of the axial engagement element. The individual partial sections have different lengths. Partial section 16a providing the clearance fit for the introduction of the axial engagement element has only approximately one third to one fourth the length of partial section 16b with press fit. Assuming a length of the axial engagement element of approximately 6 mm, the partial section 16a would be approximately 1.5 to 2 mm. The remaining partial section 16b serves for a reliable fastening of the axial engagement element by a press fit.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In an open-end rotor spinning device having a spinning rotor, an arrangement for supporting and driving the spinning rotor comprising a drive shaft affixed to the rotor, the shaft having a free end defining a receptacle opening axially outwardly, an axial engagement element received and supported in the receptacle, the axial engagement element being made of a material harder than steel, and an axial bearing having a housing concentric to the shaft axis and a ball contained within the housing for axial engagement with the engagement element of the shaft, the free end of the shaft comprising a ventilation bore formed radially through the free end of the shaft for connecting the receptacle with the ambient environment.

2. The arrangement for supporting and driving a spinning rotor according to claim 1, wherein the ventilation bore comprises a plurality of bores arranged in the free end of the shaft at equal angular intervals thereabout.

3. The arrangement for supporting and driving a spinning rotor according to claim 1, wherein the ventilation bore comprises a linear bore extending through the free end of the shaft.

4. The arrangement for supporting and driving a spinning rotor according to claim 1, wherein the receptacle comprises a portion not occupied by the axial engagement element, the ventilation bore connecting the unoccupied portion of the receptacle to the ambient environment.

5. The arrangement for supporting and driving a spinning rotor according to claim 1, wherein the ventilation bore comprises a plurality of bores each having substantially the same diameter.

6. The arrangement for supporting and driving a spinning rotor according to claim 1, wherein the diameter of the ventilation bore is smaller than the diameter of the free end of the shaft by at least a power of ten.

7. The arrangement for supporting and driving a spinning rotor according to claim 1, wherein the diameter of the ventilation bore is between 0.2 mm and 0.5 mm.

8. The arrangement for supporting and driving a spinning rotor according to claim 1, wherein the axial engagement element has opposite ends of substantially identical configuration.

9. The arrangement for supporting and driving a spinning rotor according to claim 1, wherein the receptacle for the axial engagement element in the shaft comprises an entrance portion adjacent the axially outward end of the shaft and dimensioned relative to the axial engagement element to provide a clearance fit with respect thereto to facilitate introduction of the axial engagement element into the receptacle, and a retaining portion axially inwardly of the entrance portion and dimensioned relative to the axial engagement element to provide a press fit with respect thereto to facilitate securement of the axial engagement element within the receptacle.

10. The arrangement for supporting and driving a spinning rotor according to claim 9, wherein the length of the retaining portion of the receptacle is approximately three to four times the length of the entrance portion of the receptacle.

* * * * *